Nov. 5, 1963 L. DI RICCO 3,109,749
WEAR RESISTANT MAGNETIC RECORDING MEDIA
Filed Dec. 11, 1961
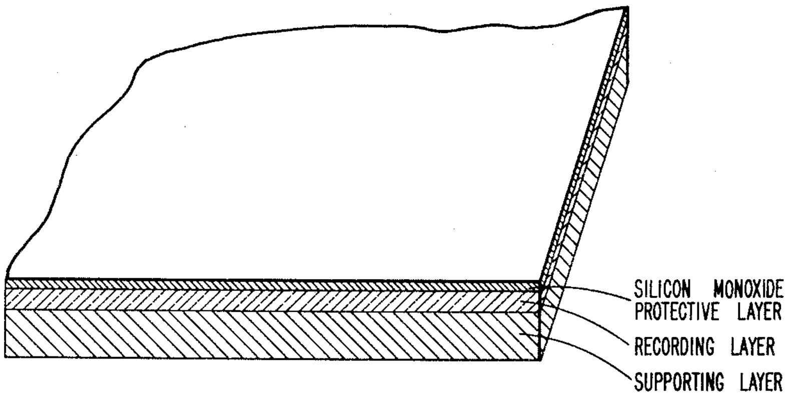
*INVENTOR.*
LEO DI RICCO

1

3,109,749
WEAR RESISTANT MAGNETIC RECORDING MEDIA
Leo di Ricco, San Jose, Calif., assignor to International Business Machines Corporation, New York, N.Y., a corporation of New York
Filed Dec. 11, 1961, Ser. No. 158,563
7 Claims. (Cl. 117—72)

My invention relates to storage elements for computers, and more specifically, to improving the wear characteristics of storage elements which utilize magnetic oxide coatings on non-magnetic substrates.

Previously, silicon monoxide has been coated on glass optics and optics made of cross linked methyl-α-chloro polymethacrylate and allyl diglycol carbonate. Generally, if silicon monoxide is to be coated on most plastics, the surface of the plastics must be vacuum coated with a metal such as aluminum or germanium and this metal layer coated with silicon monoxide.

Computers can use, as storage elements, nonmagnetic discs, drums, tapes, strips, or stripes on paper cards as coated with a paint containing a magnetic oxide. The problems facing the storage element designer are illustrated in the following discussion of random access machines.

In a random access storage system of the 305 RAMAC® type, magnetic discs are stacked, one above the other, spun at a speed of about 1200 r.p.m., and read by a recording head whichi s moved from disc to disc and from area to area on a disc at relatively high speeds in response to commands from an operator.

In machines of this type, the recording head floats about 25 microns above a disc surface on an air bearing created by blowing compressed air through the recording head onto the disc surface. In spite of considerable care on the part of designers, the "flying" head still sometimes "crashes" into the spinning disc due to disc irregularities and other causes. This bombardment of the disc by the recording head causes further roughness in the disc surface, loss of magnetic characters, and finally, the disc must be discarded.

In later random access storage systems, the recording head flies about 2.5 to about 5.0 microns above a disc which rotates at about 1800 r.p.m. The compressed air cushion used in these machines is created by the relative motion between the disc and the recording head. Impact problems are materially increased in these machines, especially since the magnetic coating covering the disc is only about 0.25 mil thick. Even small "hills" and "valleys" change the configuration of the air gap between the recording head and the disc, causing the recording head to crash into the disc.

In an effort to create a surface of desired smoothness, impact resistance, hardness and magnetic characteristics for use in the later random access storage systems, applicant studied many types of coatings, lubricants, etc.

Applicant has now discovered that silicon monoxide can be vacuum deposited on magnetic coatings, utilizing epoxy resins and polyurethanes as the pigment vehicles.

The sole FIGURE shows one preferred embodiment of the invention.

Preferably, the coatings on which SiO is deposited are thermosetting resins. It is preferred that the vehicle be an epoxy resin formulation of the class known as the baking type coating.

The coatings which can be utilized in our process contain ferromagnetic pigments which are well known to the art. Magnetic iron oxide is an example of such a pigment. Powders of ferritic materials can also be utilized to advantage. Examples of such ferrite materials include spinel structure powders having the composition $MeFe_2O_4$ where Me is a divalent transition metal ion such as $Mn^{++}$, $Fe^{++}$, $Ni^{++}$, $Co^{++}$, $Cu^{++}$, $Zn^{++}$, $Cd^{++}$, or $Mg^{++}$, or mixtures thereof. These materials should have a particle size of from about 0.2 to about 2.0μ and preferably, of about 0.5 to about 1.5μ.

2

Preferably, from about 20 to about 67 percent by weight of the total coating pigment is included in the resin. The epoxy-bisphenol intermediate resins which are utilized in the preferred films have melting points of from about 60° to about 155° C.; and epoxide equivalents of from about 400 to about 4200. Preferably, the epoxide equivalent is from about 450 to about 4000. Still more preferably, the melting point is from about 90° to about 135° C. and the epoxide equivalent is from about 850 to about 2500. Epoxide equivalent is defined as the grams of resin containing one gram equivalent of epoxide.

The usual additives, such as solvents, flow control agents, plasticizers, and curing agents are utilized in formulating the desired vehicles.

As previously indicated, epoxy-based baking type coatings are the most preferred thermosetting resins for use as vehicles in making the magnetic media of our invention. Examples of such coatings include epoxy-phenolic and epoxy-urea-formaldehyde resins. In such formulations, generally from about 65 to about 85 percent epoxy resin is required and from about 35 to about 15 percent by weight of urea-formaldehyde resin, or phenolic resin.

These coatings are applied to an aluminum, tin, or other nonmagnetic substrate by spin coating, spraying, dip coating, etc. After the coating has been applied to the nonmagnetic substrate, the coating is cured and the storage element is placed in a vacuum chamber and coated with silicon monoxide.

Procedures and equipment for vacuum depositing silicon monoxide are well known to the art. Generally, however, a stoichiometric mixture of silicon and silicon dioxide are heated to about 1100° C. under a vacuum of about $10^{-5}$ mm. of mercury. A vacuum no greater than about $10^{-4}$ mm. mercury is required during this procedure. The thickness of the silicon oxide layer may vary from about 1000 A. units to about 20,000 A. or more. The preferred thickness is about 1000 A. to about 10,000 A. units. Where flexible substrates, such as tapes are used, SiO coatings of 1000–4000 A. are preferred.

The following examples more fully illustrate my invention. It is not intended that my invention be limited to the specific magnetic oxide coatings, substrates, etc. disclosed. Rather, it is intended that all equivalents obvious to those skilled in the art be included within the scope of my invention as claimed.

*Example I*

To prepare 3000 g. of coating, 870 g. of epoxy resin, having a melting point of 120–135° and epoxide equivalent of 2000–2500 was mixed with 795 g. each of diacetone alcohol and xylene. A 300 g. portion of phenolic intermediate (an allyl ether or methylol phenol) was added to the epoxy resin mixture. A solution of 12 g. of methylphenylpolysiloxane resin, prepared by the general process of Example IV of U.S. Patent 2,258,222, was dissolved in a mixture of 30 g. each of diacetone alcohol and xylene. The solution was then added to the mixture of epoxy resin and intermediate. A solution of 24 g. of 85 percent phosphoric acid was formed with 72 g. of diacetone alcohol and 75 g. of xylene. The phosphoric acid was then mixed into the epoxy resin-phenolic resin mixture and the mixture allowed to age for several days in a glass container.

After completion of aging, 1182 g. of dried iron oxide powder having a particle size of about 0.2 to about 2.0μ was added to the resin mixture. The resulting conglomeration was milled for 2 hours in a ball mill having a capacity of about 18 qts. and containing 25 lbs. of ½-inch diameter porcelain balls. The mill was rotated at 48 r.p.m. After milling, the coating was paddled overnight and adjusted to Zahn No. 3 cup viscosity of 24 seconds with diacetone alcohol-xylene (50:50). The coating was poured onto a spinning Mylar tape backing, 5 mils thick, which had been cleaned with acetone.

After coating, the coated polyethylene terephthalate film was cured for two hours at a temperature of 149° C.

*Example II*

About 9000 g. of a coating composition was made up by dissolving 1400 g. of epoxy resin, similar to that of Example I, in 2000 g. of diacetone alcohol and 1000 g. each of xylene and toluene. 2000 g. of magnetic iron oxide, similar to that of Example I, was added to the epoxy resin solution. The mixture was then placed in a ball mill at 48 r.p.m. for 72 hours. At the end of this time, 1200 g. of butylated urea-formaldehyde resin was added to the oxide mixture, containing 50 percent by weight solids (Bettle Resin 227–8, manufactured by the American Cyanamid Corporation) and paddled overnight. The viscosity was adjusted to 26 seconds with a mixture of diacetone alcohol, xylene and toluene (2:1:1). Mylar tapes were again coated and the coatings cured for two hours at 149° C. to yield a magnetic tape having properties equivalent to those of Example I.

*Example III*

A modified epoxy-phenolic coating was made up by dissolving 175 g. epoxy resin, having a melting point of from about 95° to about 105° C. and epoxide equivalent of 875 to 1025 in a mixture of 167 g. each of xylene, isophorone, and ethyl amylketone. 340 g. of magnetic iron oxide was added to the mixture which was then placed in a ball mill and milled at 48 r.p.m. for 72 hours. To the mill mixture, 93 g. of phenolic, similar to that used in Example I, 67 g. of polyvinylmethyl ether, 5 g. of methylphenylpolysiloxane, similar to that of Example I, and 7 g. of hexahydrophthalic anhydride were added. The resulting resin was paddled overnight and the viscosity adjusted to 26 seconds Zahn Cup No. 3 with the above described solvent mixture (⅓ each by weight) of xylene, isophorone and ethyl amyl ketone. This paint was utilized to coat Mylar tapes which were cured at 149° C. These films had properties equivalent to those of Example I.

*Example IV*

A polyurethane coating was made by dissolving 100 g. of a phenol-blocked polyisocyanate having 11.5 to 13.5 weight percent available isocyanate groups and having a softening range of 75° to 95° C. (Mobay Chemical Co.) into a solvent system consisting of 187.5 g. Cellosolve acetate (a polyethylene isoglycolate acetate) and 112.5 ml. of xylene. To the above was added 100 g. of polyethyl resin having a hydroxyl number of 41–47 and an equivalent weight (based on percent hydroxyl) of .920 (Multron R–18, manufactured by the Mobay Chemical Co.).

*Example V*

A coating was prepared by dissolving 66.9 g. of an epoxy resin having an epoxide equivalent of 425–550 and a melting point of 65°–75° C. (Epon 1001, manufactured by Shell Chemical Co.) each of methylisobutyl ketone, a lower molecular weight polyoxyethylene glycol (Cellosolve) and xylene; adding 5.6 g. of butylated urea formaldehyde resin; and mixing in 102.6 g. of magnetic iron oxide particles.

This mixture was milled for 72 hours at 100–200 r.p.m. A curing agent mixture was prepared from 30 g. of polyamide (Versamid 115, manufactured by General Mills Corporation) and 10 g. each of MBIK (Cellosolve) and xylene. After milling, the curing agent was added to the base mixture with agitation adjusted to Zahn No. 3 cup 14.5 seconds viscosity and coated on a Mylar substrate. The coating was allowed to cool at room temperature for two days and found to adhere tenaciously to the Mylar during flexing.

*Example VI*

A disc coating of the formulation of Example I was coated on a disc for use in a RAMAC 305® computer. To coat the disc, the disc was spun at 200 r.p.m., and the magnetic oxide paint poured onto the disc by a nozzle positioned at the inner edge of the disc. The nozzle was held at the inner edge of the disc until the paint flow line (wave) had reached a midpoint between the inner and outer edges of the disc. Pouring was continued as the nozzle traversed toward the outer diameter of the disc at a speed such that the paint flow from the nozzle did not cross the flow line.

*Example VII*

Discs made by the process of Example VI with the coating of Example III were placed in a vacuum chamber at $10^{-5}$ and exposed to the vapors of a silicon-silicon dioxide mixture. Silicon monoxide layers of 2000, 3000, and 4000 A. were laid down on various discs. When tested, the film was found to wear more than ten times better than an uncoated disc, as determined by the weight loss using a Tabor abraser utilizing a CS #10 wheel with a 250 g. loading for 200 cycles.

The following table sets out the weight losses of the coated and uncoated magnetic films:

| Film Thickness, A | Weight Loss in Grams | |
|---|---|---|
| | Uncoated Film | SiO Coated Film |
| 2,000 | 0.0014 | 0.0001 |
| 3,000 | 0.0010 | 0.0001 |
| 4,000 | 0.0015 | 0.0001 |

*Example XIII*

To coat samples placed on Mylar substrate, the coated samples are placed in a vacuum chamber and silicon monoxide is coated thereon as per the process of Example VII.

Now, having described my invention, I claim:

1. An article of manufacture comprising a substrate having adhered thereto, a coating of a comminuted pigment in a vehicle selected from the group consisting of epoxy resins and polyurethanes, and an essentially continuous silicon monoxide layer, said silicon monoxide layer being adhered to said coating.

2. A magnetic recording element comprising a nonmagnetic substrate and having adhered thereto a thermosetting coating of a ferromagnetic pigment in a vehicle selected from the group consisting of epoxy resins and polyurethanes and an essentially continuous silicon monoxide layer, said silicon monoxide layer being adhered to said coating.

3. A magnetic recording element comprising a nonmagnetic substrate having adhered thereto a bake-type thermosetting coating of a ferromagnetic pigment in a vehicle selected from the group consisting of epoxy-phenolic resins, epoxy-urea-formaldehyde resins and polyurethanes; and an essentially continuous layer of silicon monoxide, said silicon monoxide layer being adhered to said coating, and at least about 1000 A. in thickness.

4. A magnetic recording element comprising a substrate having adhered thereto a coating of a ferromagnetic pigment in a bake-type epoxy-phenolic resin, and adhered thereto, an essentially continuous silicon monoxide layer.

5. A magnetic recording element comprising a substrate having adhered thereto a coating of a ferromagnetic pigment in a bake-type epoxy-urea-formaldehyde resin, and adhered to said coating, an essentially continuous silicon monoxide layer.

6. A magnetic recording element comprising a substrate having adhered thereto, a coating of a ferromagnetic pigment in polyurethane, and adhered thereto, an essentially continuous silicon monoxide layer.

7. The process of increasing the wear resistance of a magnetic storage element having a coating of a ferromagnetic pigment in a vehicle selected from the group consisting of epoxy-resins and polyurethanes adhered to a substrate, the step comprising condensing on said coating, under vacuum, vapors of silicon monoxide.

References Cited in the file of this patent

UNITED STATES PATENTS

| | | |
|---|---|---|
| 2,923,642 | Hausen | Feb. 2, 1960 |
| 2,978,414 | Harz et al. | Apr. 4, 1961 |

OTHER REFERENCES

Holland: Vacuum Deposition of Thin Films, pp. 343–344, Wiley & Sons, New York, 1956.

Haines: IBM Technical Disclosure Bulletin, vol. 2, No. 4, p. 28, December 1959.